Aug. 19, 1958
E. A. ZEMROWSKI
2,848,020
TENON CUTTING TOOL
Filed May 2, 1957
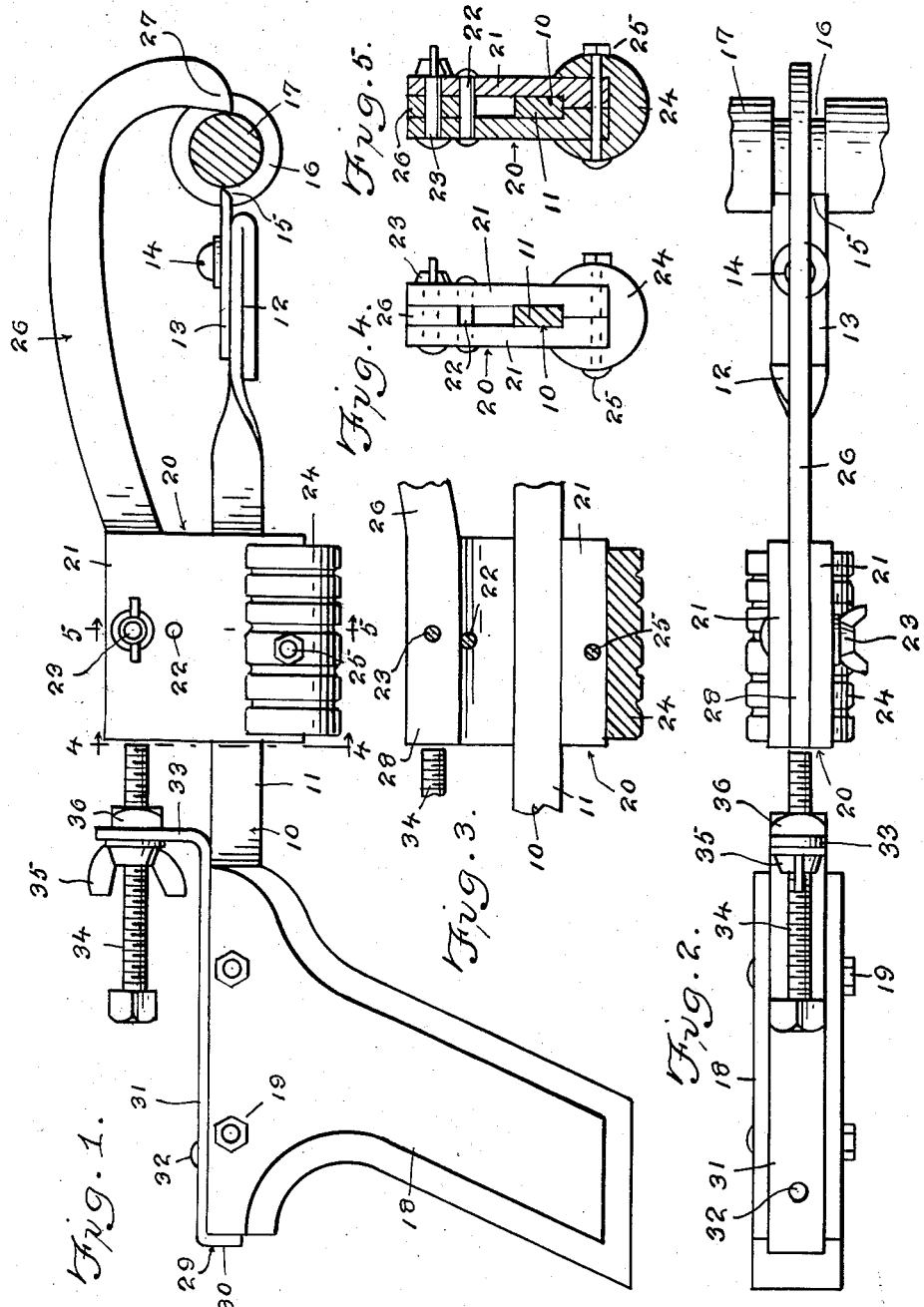
INVENTOR.
Edmund A. Zemrowski
BY Victor J. Evans & Co.
ATTORNEYS United States Patent Office 2,848,020
Patented Aug. 19, 1958

2,848,020

TENON CUTTING TOOL

Edmund A. Zemrowski, Michigan City, Ind.

Application May 2, 1957, Serial No. 656,598

1 Claim. (Cl. 142—56)

This invention relates to a tenon cutting tool.

This invention is an improvement over the tool shown and described in my prior Patent No. 2,764,187.

The object of the invention is to provide a tool that includes a means for supporting a cutting blade in the vicinity of a work piece, and wherein there is further provided a caliper which has a portion thereof arranged in the vicinity of the cutting blade.

Another object of the invention is to provide a cutting tool which includes a shank that has a handle connected to one end thereof, there being a cutting blade on the other end of the shank, and wherein the support member is mounted on the shank, the support member carrying a caliper which is adapted to coact with the cutting blade so that for example a work piece such as a round tenon can be accurately cut to a desired size or shape.

A further object of the invention is to provide a cutting tool which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view of the cutting tool, constructed according to the present invention, and showing the tool being used on a workpiece such as a tenon.

Figure 2 is a top plan view of the assembly shown in Figure 1.

Figure 3 is a fragmentary sectional view taken through the support member.

Figure 4 is a sectional view taken on the line 4—4 of Figure 1.

Figure 5 is a sectional view taken on the line 5—5 of Figure 1.

Referring in detail to the drawings, the numeral 10 designates a shank which includes a main portion 11 and a folded end portion 12. A cutting blade 13 is connected to the folded end portion 12 in any suitable manner such as by means of a securing element or screw or bolt 14, and the cutting blade 13 is provided with a cutting edge 15 for use in cutting or working on work piece 17 so that, for example, a groove or cutout 16 can be formed.

Connected to the other end of the shank 10 is a handle 18, and the handle 18 may be connected to the shank 10 in any suitable manner, as for example by means of bolt and nut assemblies 19.

Movably mounted on the main portion 11 of the shank 10 is a support member which is indicated generally by the numeral 20. The support member 20 includes a pair of plates 21 which have a pin 22 extending therebetween. A bolt and nut assembly 23 also extends through the plates 21 as shown in Figure 5. Mounted on the lower portion of the support member 20 is a handgrip 24 which is secured in place by means of a bolt and nut assembly 25.

Extending from the support member 20 and connected thereto is a caliper 26 which includes an end portion 27 that terminates adjacent the cutting blade 13. The caliper 26 further includes a finger 28 adjacent to the pin 22 as shown in Figure 3, and the bolt 23 extends through the caliper 26 whereby the caliper is retained in its proper position.

Connected to the handle 18 is a bracket which is indicated generally by the numeral 29, and the bracket 29 includes an end section 30, a first section 31, and a right angularly arranged second section 33. A screw member 34 extends through the section 33, and a wing nut 35 and lock nut 36 are mounted on the screw member 34.

From the foregoing, it is apparent that there has been provided a cutting tool which is an improvement over the cutting tool shown and described in my prior Patent No. 2,764,187. In use, the tool can be arranged so that the cutting edge 15 of the blade 13 is arranged contiguous to the work piece 17. The work piece 17 may be a tenon or the like which is rotated in a lathe or other machine tool, and with the parts arranged as shown in Figure 1 as the work piece 17 is rotated, and with the cutting edge 15 adjacent to the work piece, it will be seen that a cutout or groove such as the groove 16 can be readily formed in the work piece. The caliper 26 is carried by the support member 20 so that the end 27 of the caliper 26 can be used to determine when the proper size of groove or cutout 16 has been formed in the work piece 17. The screw member 34 is adjustably mounted in the section 33 of the bracket 29, the bracket 29 including the section 31 which is secured to the handle 18. Thus, by setting or adjusting the screw member 34 to a desired position, and with one hand gripping the handle 18 and with the other hand engaging the hand grip 24, it will be seen that the support member 20 can be shifted along with the shank 10 until the support member 20 strikes the end of the screw member 34 whereby the caliper 27 will coact with the cutting blade 13 to insure that the groove 16 will be formed of the proper depth or size.

As previously stated, the caliper 26 is connected to the support member 20, so that after the support member 20 is shifted, the caliper 26 is moved therewith. The wing nut 35 and lock nut 36 can be used for maintaining the screw member 35 immobile in its various adjusted position.

The arm 26 acts as a half of a caliper and this arm or caliper member 26 moves back and forth as the support member 20 is moved.

By means of the present invention, there is provided a tool which is an improvement of my prior patent since the caliper can be readily removed at will so that the tool can be used in a conventional manner, in other words, it can be used as a regular wood cutting chisel. Different types of blades 13 can be used on the tool, and larger calipers can be mounted for large diameter work. Also, the tool of the present invention does not utilize a plier type of action as is the case with my prior patent, since the present invention utilizes a slide type of action.

The numeral 22 indicates the pin or rivet which extends through the support member 20 to hold the pair of plates 21 together. The screw member 34 is not secured to the member 20. The members 20 and 26 slide back and forth over the member 10. The element 36 is securely mounted on the portion 33 so as to provide threads for the screw member 34. The wing nut 35 and the adjacent lock washer are the locking members for the screw member 34 which makes the stopping point for the member 20.

The above description of the invention is for illustrative purposes only and it is understood that modifications may be made in the construction within the scope and spirit of the following claim.

I claim:

In a tool, a shank including a main portion terminating in an offset folded end portion, a blade detachably connected to said end portion and provided with a cutting edge, a handle connected to said shank, a support member movably mounted on said shank and including a pair of plates having said shank extending therebetween, a hand grip mounted on the lower portion of said support member, a caliper having one end connected to said support member and its other end curved and terminating adjacent said blade, a bracket connected to said handle and including a first section arranged contiguous to said handle and secured thereto, a second section arranged at right angles to said first section and extending therefrom in spaced parallel relation to said support member, and a screw member extending through said second section to terminate adjacent said support member.

References Cited in the file of this patent

UNITED STATES PATENTS

| | | |
|---|---|---|
| 846,272 | Whipple et al. | Mar. 5, 1907 |
| 2,064,661 | Hammond | Dec. 15, 1936 |
| 2,109,857 | Berkman | Mar. 1, 1938 |
| 2,127,893 | Stromgren | Aug. 23, 1938 |
| 2,764,187 | Zemrowski | Sept. 25, 1956 |